(12) United States Patent
Falzari (10) Patent No.: US 8,925,950 B2
(45) Date of Patent: Jan. 6, 2015

(54) FOLDABLE FRAME FOR A BICYCLE

(71) Applicant: Mauro Falzari, Mariano del Fruili (IT)

(72) Inventor: Mauro Falzari, Mariano del Fruili (IT)

( * ) Notice: Subject to any disclaimer, the term of this patent is extended or adjusted under 35 U.S.C. 154(b) by 0 days.

(21) Appl. No.: 13/897,117

(22) Filed: May 17, 2013

(65) Prior Publication Data
US 2013/0249189 A1  Sep. 26, 2013

Related U.S. Application Data

(63) Continuation of application No. PCT/EP2011/005785, filed on Nov. 17, 2011.

(30) Foreign Application Priority Data

Nov. 19, 2010 (IT) .............................. UD2010A0208

(51) Int. Cl.
B62K 15/00 (2006.01)
(52) U.S. Cl.
CPC ......... B62K 15/006 (2013.01); *B62K 2015/005* (2013.01)
USPC .......................................... 280/287; 280/278
(58) Field of Classification Search
CPC .... B62K 15/00; B62K 15/006; B62K 15/008; B62K 2015/00; B62K 2015/01; B62K 2015/005
USPC ....................... 280/287, 278, 87.05
See application file for complete search history.

(56) References Cited

U.S. PATENT DOCUMENTS

| | | | | | |
|---|---|---|---|---|---|
| 4,182,522 | A * | 1/1980 | Ritchie | .......................... | 280/278 |
| 4,582,335 | A * | 4/1986 | Paioli et al. | ................... | 280/278 |
| 4,598,923 | A * | 7/1986 | Csizmadia | .................... | 280/287 |
| 5,069,468 | A * | 12/1991 | Tsai et al. | ..................... | 280/278 |
| 6,279,935 | B1 * | 8/2001 | Wagner | ......................... | 280/287 |
| 6,286,848 | B1 * | 9/2001 | Augustin | ...................... | 280/287 |
| 6,595,539 | B1 * | 7/2003 | Belli | .............................. | 280/287 |
| 6,702,312 | B1 * | 3/2004 | Miksik | ......................... | 280/287 |
| 6,979,013 | B2 * | 12/2005 | Chen | ............................. | 280/287 |

(Continued)

FOREIGN PATENT DOCUMENTS

BE          628783 A      6/1963
DE          4400500 A1    7/1995

(Continued)

OTHER PUBLICATIONS

International Preliminary Report on Patentability Application No. PCT/EP2011/005785 Completed: Jan. 17, 2013 6 pages.

(Continued)

*Primary Examiner* — Anne Marie Boehler
*Assistant Examiner* — Maurice Williams
(74) *Attorney, Agent, or Firm* — St. Onge Steward Johnston & Reens LLC (57) ABSTRACT

A bicycle having a frame with two sections spaced apart at a distance, one section a left and one a right section, three connection respectively for a saddle, crank and front fork connected to the left and right sections. A rear fork is connected to the frame by a rotatable connection having an axis, and the rear fork can rotate from an extended position to a folded position where a wheel affixed to the rear fork inserts between the left and right sections. The rear fork may also have a series of links and a shock absorber.

24 Claims, 9 Drawing Sheets

(56) References Cited

U.S. PATENT DOCUMENTS

| | | | |
|---|---|---|---|
| 6,984,194 B2 * | 1/2006 | Ma | 482/57 |
| 7,159,884 B2 * | 1/2007 | Gu | 280/278 |
| 7,229,089 B2 * | 6/2007 | Mihelic | 280/278 |
| 7,341,268 B2 * | 3/2008 | Lin | 280/278 |
| 7,445,224 B2 * | 11/2008 | Whyte | 280/278 |
| 7,490,842 B1 * | 2/2009 | Ulrich et al. | 280/278 |
| 7,510,202 B1 * | 3/2009 | Shiao | 280/287 |
| 8,123,243 B2 * | 2/2012 | Ho | 280/278 |
| 8,308,178 B2 * | 11/2012 | Hoerdum et al. | 280/278 |
| 8,528,928 B1 * | 9/2013 | Kim et al. | 280/287 |
| 2001/0004150 A1 * | 6/2001 | Murayama | 280/287 |
| 2001/0045723 A1 * | 11/2001 | Niitsu et al. | 280/287 |
| 2003/0127825 A1 * | 7/2003 | Chen | 280/287 |
| 2004/0178604 A1 * | 9/2004 | Ma | 280/278 |
| 2005/0062256 A1 * | 3/2005 | Chen | 280/287 |
| 2005/0263978 A1 * | 12/2005 | Ascher | 280/261 |
| 2006/0244237 A1 * | 11/2006 | Chuang | 280/278 |
| 2007/0013162 A1 * | 1/2007 | Whyte | 280/278 |
| 2007/0018421 A1 * | 1/2007 | Chen | 280/278 |
| 2007/0187922 A1 * | 8/2007 | Boutakis | 280/287 |
| 2007/0273126 A1 * | 11/2007 | Pourias | 280/287 |
| 2007/0290479 A1 * | 12/2007 | Tong | 280/278 |
| 2008/0061528 A1 * | 3/2008 | Musabi | 280/287 |
| 2008/0116659 A1 * | 5/2008 | Seaman | 280/278 |
| 2009/0096187 A1 * | 4/2009 | Lapierre et al. | 280/287 |
| 2009/0146391 A1 * | 6/2009 | Sutherland | 280/287 |
| 2010/0148467 A1 * | 6/2010 | Hoerdum et al. | 280/278 |
| 2011/0025016 A1 * | 2/2011 | Waaijer | 280/287 |
| 2011/0181014 A1 * | 7/2011 | Ryan et al. | 280/263 |
| 2012/0013103 A1 * | 1/2012 | Marion | 280/639 |
| 2012/0273287 A1 * | 11/2012 | Song | 180/65.31 |
| 2013/0119635 A1 * | 5/2013 | Montero Basqueseaux | 280/287 |

FOREIGN PATENT DOCUMENTS

| | | |
|---|---|---|
| EP | 1803634 A1 | 7/2007 |
| NL | 1016175 C1 | 3/2002 |
| WO | 2005080184 A1 | 9/2005 |

OTHER PUBLICATIONS

International Search Report Application No. PCT/EP2011/005785 Completed: Jan. 19, 2012; Mailing Date: Jan. 30, 2012 3 pages.

* cited by examiner

FOLDABLE FRAME FOR A BICYCLE

FIELD OF THE INVENTION

The present invention relates to a foldable frame for bicycles and further relates to a foldable frame for a bicycle having a rear shock absorber.

BACKGROUND OF THE INVENTION

The following terms must be intended according to the definitions given in the following meanings.

The terms "front" and "rear" and, in similar way, "in the front" and "rearward", must be considered as referred with respect to the usual advancement direction of a bicycle.

The terms "upper" and "lower" and "downward" and "downwardly" and, in similar way, "above" and "below" and "upward" and "upwardly", must be considered as referred with respect to the ground with the bicycle placed in the position of normal use, in the sense that lower is indicative of a relative position closest to the ground while upper is indicative of a relative position farther from the ground.

The terms "right" and "left" must be considered as referred respectively with respect to the right or to the left of a user sitting on the saddle of the bicycle.

In the manufacturing field of foldable bicycles many solutions intended to allow that the bicycle is folded with a consequent reduction of its total encumbrance are known. In fact the bicycle represents a very light, as well as a non-polluting, locomotion means, very suitable for example in the town centres, where some limitations to the circulation of motor vehicles may also be present. However, for those who do not live in town but come from considerable distances, carrying the bicycle on other transport means is usually necessary for moving on a medium-long distance and only successively the bicycle will be used to move on the desired town path. In similar way carrying the bicycle also for those who live in town and wish to reach a destination at which using the bicycle on not necessarily short ways, as, for example, parks, hillside zones, etc. can be desirable.

For example, if main movement occurs by car, the bicycle, if not folded at sizes such to allow its stowing in the boot, must be mounted on suitable supports fixed to the car. Such supports however constitute a problem as their mounting and dismounting requires considerable effort and time. Besides this the use of these supports generally affects considerably the fuel consumes of the same car. Additionally even the activity for fixing the bicycle to the supports can be difficult, mainly in the cases in which such supports are mounted on the upper part of the car roof.

For example, if the main movement is carried out by train, the transport of a traditional bicycle along with the traveller is possible only if the train is equipped with suitable cars, while the transport of a bicycle that could be reduced to sizes similar to those of a usual luggage would be easy and would be allowed.

For example, if the main movement occurs on local buses or bus the transport of the bicycle with the traveller is impossible for reasons of encumbrance of the same bicycle.

Other situations in which the supply of a foldable bicycle is advantageous are for example those in which in a block of flats does not exist a sheltered space suitable for stowing the bicycles and bringing the bicycle in the house would be difficult both from the point of view of the same transport and from the point of view of the space required to keep it within the house. Moreover the traditional bicycles are unsuitable also in case of other conditions e.g. the transport of the same bicycles on boats, mobile home or camper van.

Usually the frame of a bicycle consists of an upper horizontal tube or "top tube" and of a main longeron that connects the front semi-frame, carrying the front wheel and the handlebar, to the rear semi-frame carrying the rear wheel and the saddle with the relative support stanchion.

Some of the prior art techniques for foldable bicycles are conceived in such a way that the frame of the bicycle is without the upper horizontal tube and that the main longeron is divided in two halves hinged to each other with an axis hinge substantially perpendicular as to the longeron. In this way the bicycle can be folded so to pass from a condition of maximum encumbrance in the configuration with front semi-frame and rear semi-frame reciprocally longitudinally aligned to a condition of minimum encumbrance in which by refolding the semi-frames sideways to one another the length of the bicycle is reduced.

Some of the prior art techniques provide a frame with telescopic structure in which there are two semi-longerons movable between the two positions in which one of the two semi-longerons is inserted inside or extracted from the second of the two semi-longerons.

A lot of the prior art techniques to obtain a compact closed structure utilize wheels of small diameter to obtain a reduction of the total encumbrance.

The patent BE628783A discloses a bicycle equipped with an articulated and foldable element that allows a reduction of the encumbrances in which the supporting structure of the rear wheel is designed to rotate around a transverse axis coinciding with the axis of the pedals in order to be able to position the rear wheel within a stanchion between the saddle and the handle-bar.

The patent NL 1016175 discloses a foldable bike comprising a frame consisting of a main frame and of an under frame in which the under frame is rotary around a fulcrum point that forms the connection between main frame and under frame and in which the pedals and the transmission mechanism remain under tension. In folded condition the saddle-holder tube is pushed downward and the under frame rotates around the fulcrum point and the saddle-holder tube acts as locking fastener preventing the reopening of the bike from its folded condition.

The patent EP 1803634 discloses a bicycle comprising a frame and a rear arm integrated in the frame in which the rear arm is made up of two horizontal arms whose close ends are articulated in correspondence of the frame and whose distal ends are connected to the ends of oblique rear arms that fix to the frame by a male-female coupling of the tube for the saddle. Also an articulation of the rear arm is provided.

The patent WO 2005080184 discloses a foldable bike comprising a frame and a hub in which the rear wheel is mounted on the frame by means of a supporting element foldable with the wheel by rotation around the hub towards the front of the bicycle.

The patent DE 4400500 (A1) discloses a frame for bicycles having a folding point that allows the folding of the supporting rear fork of the rear wheel towards the front and then upwards, leaving the frame unaltered.

The prior art techniques for foldable bicycles providing that the frame of the bicycle is without the upper horizontal tube and that the main longeron is divided in two halves hinged to one another with a hinge are not very satisfactory from the point of view of the total reduction of the encumbrance of the bicycle in the closed configuration because the encumbrance of the folded bicycle in any case involves a considerable thickness represented by that of the two reciprocally adjacent semi-frames and also a considerable total dimension represented by the maximum dimension between the length of the front semi-frame and the length of the rear semi-frame. Additionally even the encumbrance in height may result problematic due to the presence of the wheels. Besides these problems, such prior art techniques are often subjected to the occurrence of clearances at the connection hinge of the semi-frames. The presence of clearances is likely to involve a difficulty of use and manoeuvre of the bicycle. Furthermore the connection hinge is a point subject to stress and it can be subject to also sudden yielding with consequent possibility to cause accidents.

Some of the prior art techniques provide a frame with telescopic structure in which there are two semi-longerons movable between the two positions in which one of the two semi-longerons is inserted inside or extracted from the second of the two semi-longerons. Such structures prevent the bicycle from taking a configuration similar to that of a traditional bicycle because the resort to a telescopic closure system hardly makes possible the coexistence of longeron and upper tube unless they are not reciprocally parallel. The presence of frame structures with reciprocally parallel longeron and upper tube involves the execution of frame structures that have important problems of use and that are however bulky. Moreover the presence of telescopic structures can lead to the presence of clearances in the coupling between the telescopic elements as well as to the presence of blocking of the telescopic movement. The presence of dirt that accumulates in the course of time is likely to bring to locking of the telescopic movement requiring important efforts both for the opening and for the closure of the frame, or requiring a dismounting of the same for a deep cleaning. The presence of sliding elements one inside the other involves moreover the risk to damage the protective superficial painting of the frame, exposing the bicycle to the occurrence of deterioration phenomena due to the rust just in the most delicate zones of the coupling.

The solutions of the technique providing the use of wheels of small diameter have important drawbacks as the their use is restricted to solutions in which a short range mobility is required and are hardly suited to an intensive use of the bicycle or to a sporting use because the presence of wheels of small diameter involves conditions of instability and of transmission of the stresses due to the unevenness of the ground. This type of bicycles must be necessarily used on very regular and smooth surfaces and for covering medium-long distances important efforts that limit their use are required.

Many prior art techniques need particular contrives to maintain the bicycle in safety in the position of use that consist of complications of the closure mechanism and that involve additional costs necessary to the strengthening of the maintenance of the connecting joints in the desired condition when the bicycle is in the condition of use.

Many prior art techniques do not allow the use of rear shock absorbers for damping the vibrations coming from the roughness of the ground.

Some of the prior art techniques providing the use of rear shock absorbers for damping the vibrations have the disadvantage that the shock absorber is placed so that part of the pedalling energy is transferred to the shock absorber and absorbed by the same, increasing the effort necessary for the pedalling.

SUMMARY OF THE INVENTION

In summary, the present invention relates to a frame for bicycles having a first frame with: a first connection for a saddle, in correspondence with a first end of the first frame; a second connection for a handle-bar and a first fork or front fork bearing a front wheel, in correspondence with a second end of the first frame; a third connection or connection for a couple of pedal cranks bearing pedals and a supporting front sprocket of a chain transmitting the motion from the pedals to a rear sprocket mounted on a rear wheel, in correspondence with a third end of the first frame. The frame further includes a second frame or swinging fork. The rear end of the second frame or swinging fork includes a seat for fixing the rear wheel, the front end of the second frame or swinging fork comprising on the upper part engagement means able to couple with corresponding coupler means present behind said first frame in correspondence with a side of said first frame in between said first end and said third end, said second frame or swinging fork below a fifth connection able to the fixing of a third pin.

The aim of this invention is to supply a foldable frame for a bicycle that is both light and strong and that allows to obtain, in the extended configuration, a bicycle of normal total sizes, with wheels of sizes suitable also to an intensive use of the bicycle.

In the folded configuration, instead, it is wished to have a possible minimum encumbrance which allows to obtain a very regular arrangement of the components of the bicycle to allow its stowing and transport in easy way both in the boot of a car and on suburban and urban means of transport, as well as in a flat, camper van, mobile home, etc.

An additional aim of the present invention is to execute a foldable frame for a bicycle that allows a fast passage from the extended configuration to the folded configuration and vice-versa.

An additional aim of the present invention is to execute a foldable frame for a bicycle that allows the recourse to a rear shock absorber that filters in an effective way the vibrations due to the roughness of the ground.

The solution in accordance with the present invention, by the considerable creative contribution whose effect constitutes an immediate and not-negligible technical progress, presents many advantages.

First of all the solution according to the present invention allows to obtain a foldable bicycle which in the folded condition assumes a very regular and compact shape and easily storable in a small size environment.

Moreover the solution according to the present invention allows to obtain a foldable bicycle that in the extended or of use condition assumes the sizes of a normal bicycle, favouring its use not only in conditions of short range local mobility, but also in case of medium-long range mobility.

The solution according to the present invention allows the recourse to wheels of normal sizes, avoiding the resort to wheels of reduced diameter, with the advantage that the bicycle can be configured for innumerable uses e.g. as racing bike, mountain bike type, town bike, etc. practically obtaining a bicycle that in condition of use maintains all the functionalities and the characteristics of a not-foldable normal bicycle.

The solution according to the present invention allows to filter effectively the vibrations induced by the roughness of the ground by means of the recourse to a rear shock absorber.

BRIEF DESCRIPTION OF THE DRAWINGS

In the following is described an embodiment solution with reference to the included drawings namely to be considered as a non-limiting example of the present invention in which.

DETAILED DESCRIPTION OF THE INVENTION

Figure 1:
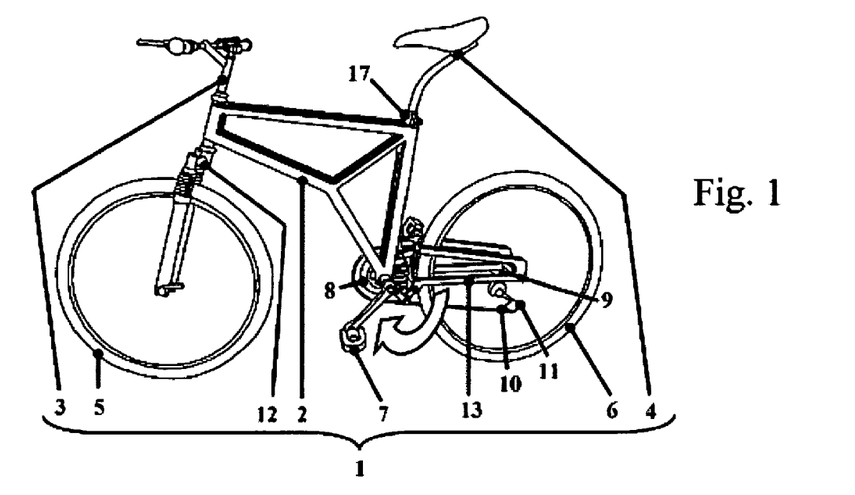
FIG. 1 represents a side perspective view of a bicycle utilizing the frame according to the present invention in which the spokes of the rear and front wheels were not represented for illustrative simplicity.
Figure 4:
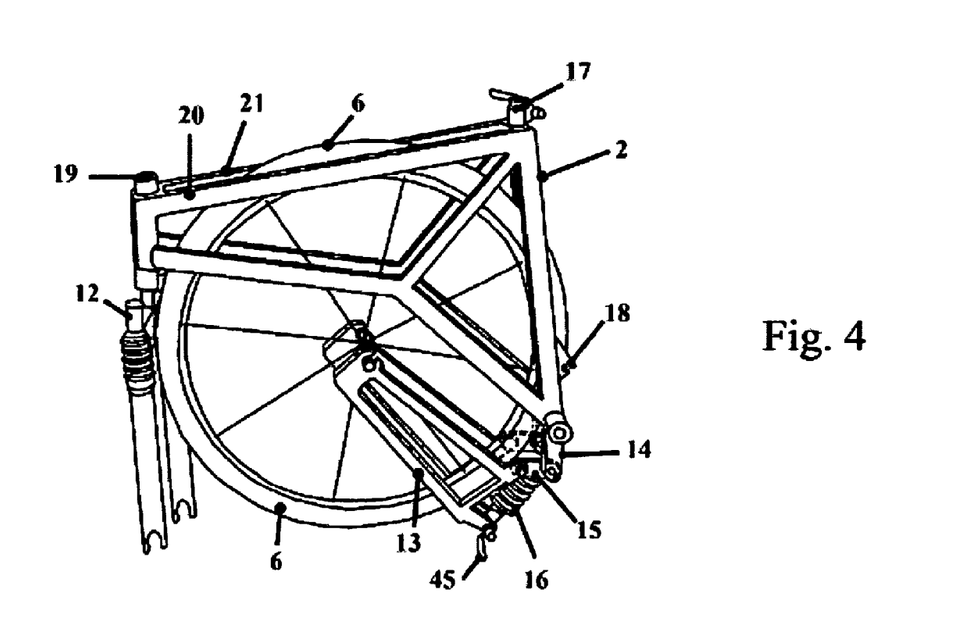
FIG. 4 represents a side perspective view showing the closure condition of the bicycle utilizing the frame of FIG. 1.

FIG. 1 shows The foldable frame (2, 13) for a bicycle (1) made according to the present invention a first frame (2) on which is present a first connection (17) to fix the saddle (4) and as shown in FIG. 4, a second connection (19) to fix the handle-bar (3) with corresponding connection to fix the first fork (12) or front fork (12) bearing the front wheel (5) a second frame or swinging fork (13) comprising an eyelet to fix the rear wheel (6).

The first frame (2) includes the connections for the pedals (7) that engage on a front sprocket (8) whose rotary motion is transmitted by means of a chain (10) to a rear sprocket (9) integral with the rear wheel (6) if necessary by means of a chain-tightener (11) placed on the right side of the bicycle. Such devices and mechanisms are of known art and will not be described in detail, their representation being omitted in some of the figures to facilitate the understanding of the invention, being obvious to those skilled in the art the configuration and the disposition of such elements. In similar way the bicycle (1) will be equipped with levers of the brakes in correspondence of the handle-bar (3) connected to braking devices of known art. Though in the form of embodiment shown, for simplicity, a system with front sprocket (8) and rear sprocket (9) with only one front sprocket and a single rear sprocket has been represented, the bicycle (1) can also be equipped with a system endowed with more front sprockets and more rear sprockets with gear-shift device between the different rear sprockets and a gear-shift device between the different front sprockets controlled by corresponding gear levers. Preferably the connection between the levers of the brakes and the braking devices and between the gear-shift devices and the gear-shift levers occurs by means of cables that are made pass at least partially and at least for some sections internally to the first frame (2) which in the preferred form of embodiment of the present invention is internally hollow. Alternatively the connection may occur by means of cables that are fixed outside of the first frame (2) following its development. Still alternatively braking devices of the counter-pedal type may be provided in which the braking is controlled by exerting a pedalling action according to a rotation direction opposite with respect to the rotation direction by which the rear sprocket is put in rotation to control the advancement of the bicycle.

FIG. 4 shows The first frame (2) is shaped with a reciprocally parallel first portion (20) and a second portion (21) and longitudinally developing lengthwise of the bicycle (1) and reciprocally spaced by a distance which corresponds to and is greater than the maximum width of the rear wheel (6). The space defined by the separation between the reciprocally spaced first portion (20) and the second portion (21) constitutes an insertion cradle for the rear wheel (6).

Figure 8:
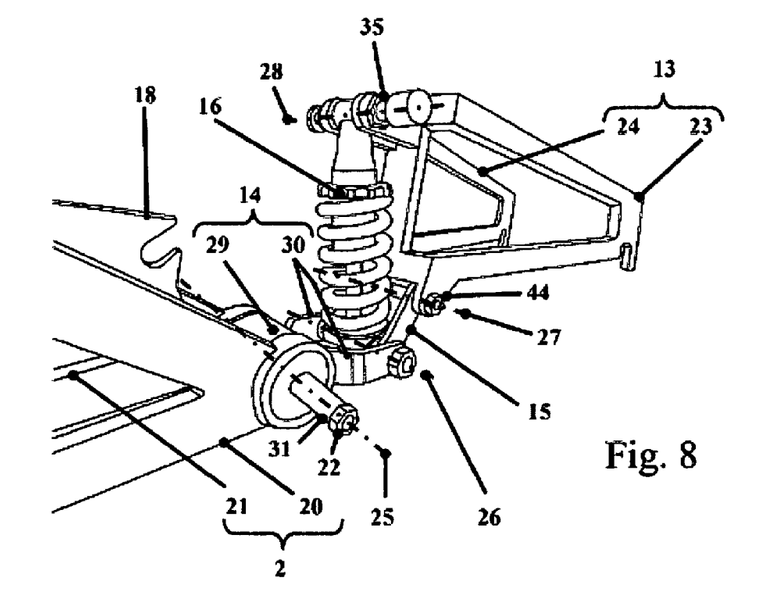
FIG. 8 represents a perspective view of the frame of FIG. 7 from a different point of view in which the first frame is represented only partially.
Figure 9:
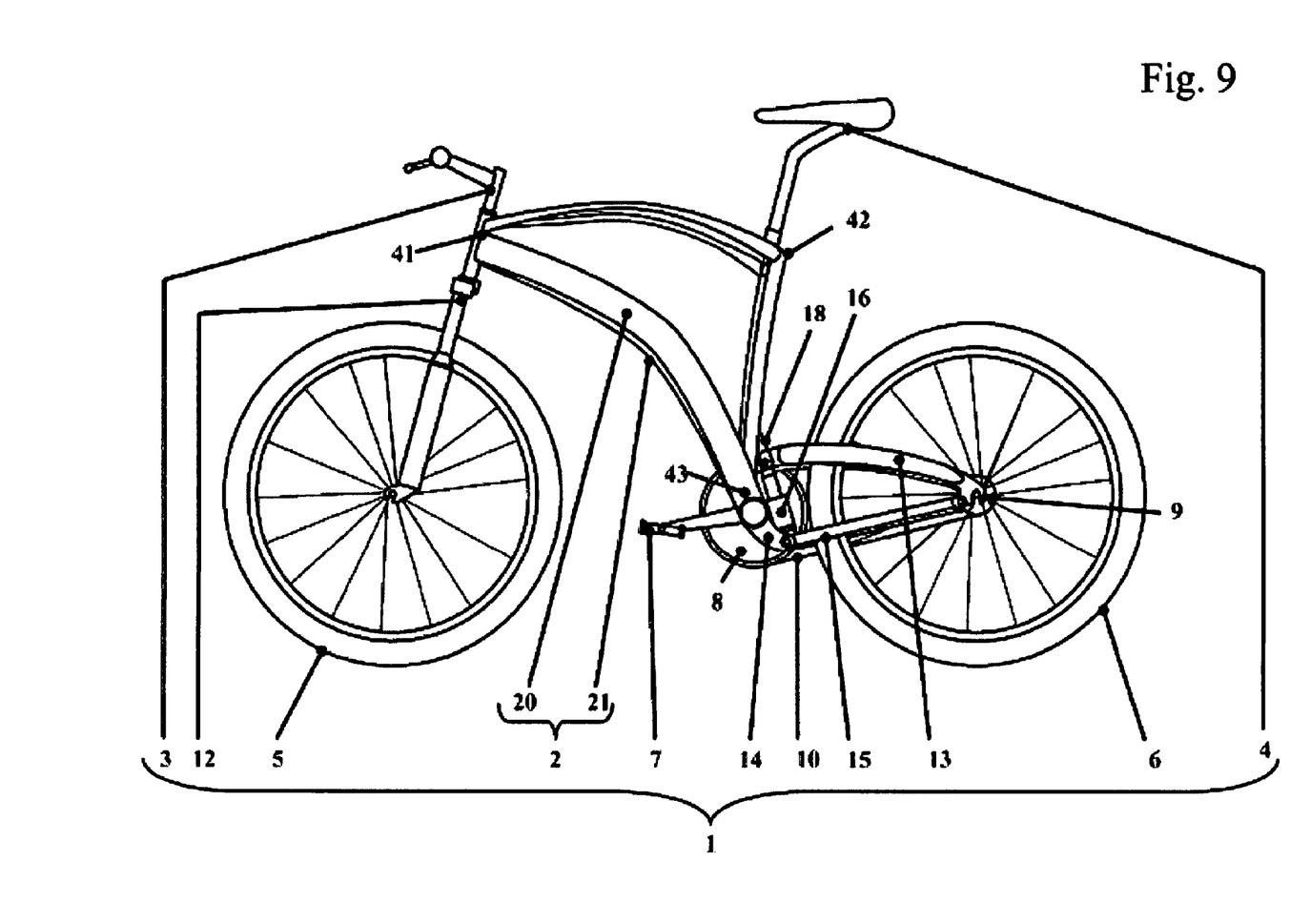
FIG. 9 represents a side perspective view of a bicycle utilizing the frame of the present invention according to a different embodiment.
Figure 10:
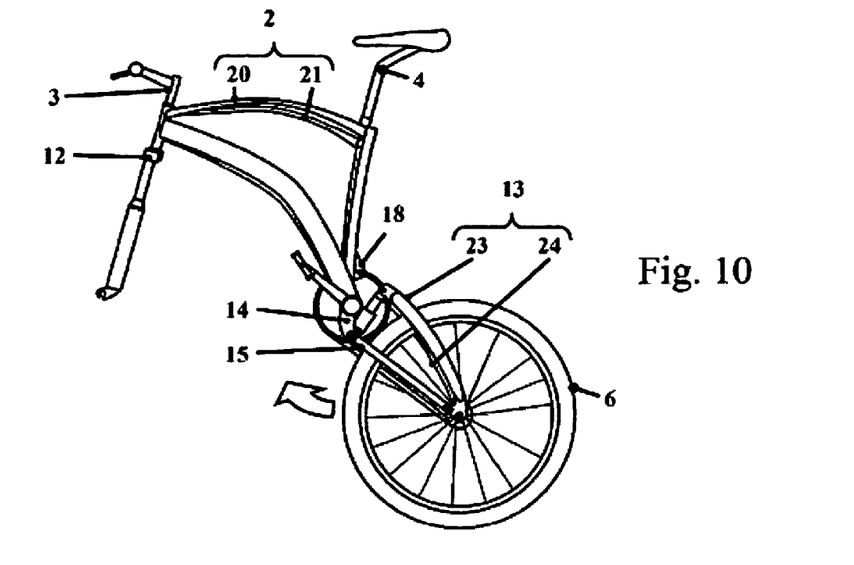
FIG. 10 represents a side perspective view showing a first phase of the closure of the bicycle utilizing the frame of FIG. 9.
Figure 11:
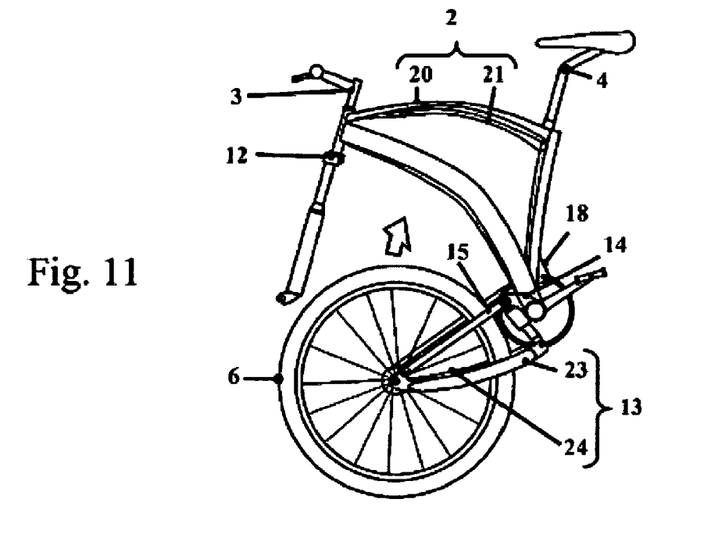
FIG. 11 represents a side perspective view showing a second phase of the closure of the bicycle utilizing the frame of FIG. 9.

FIG. 8 shows the second frame or swinging fork (13) is shaped with a third portion (23) and a fourth portion (24) essentially reciprocally parallel or slightly diverging in the direction towards the rear part of the bicycle (1). The third portion (23) and the fourth portion (24) longitudinally develop lengthwise of the bicycle (1) and are reciprocally spaced of a distance which corresponds to and is greater than the maximum width of the rear wheel (6). The third portion (23) and the fourth portion (24) include the seats for the fixing of the rear wheel (6).

The second frame or swinging fork (13), bearing the rear wheel (6), is fixed at the first frame (2) by means of a leverage (14, 15) that allows the rotation and the translation of the second frame or swinging fork (13) with respect to the first frame (2). The roto-translation movement of the second frame or swinging fork (13) by means of the leverage (14, 15) allows the movement of the rear wheel (6) from: an extended position in which the rear wheel (6) is in the position of use behind the first frame (2); to a withdrawn position in which the rear wheel (6) is within the insertion cradle for the rear wheel (6) defined by the separating space between the first portion (20) and the second portion (21) of the first frame (2).

Figure 6:
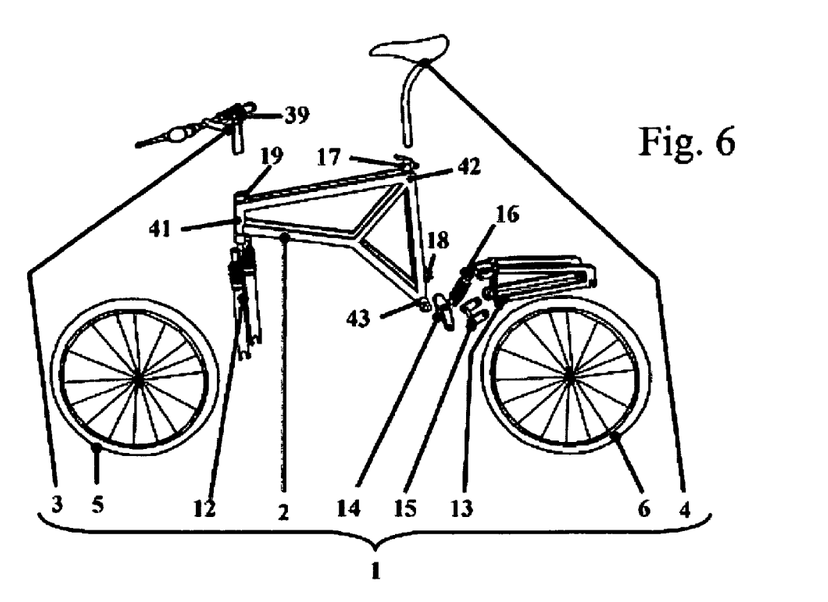
FIG. 6 represents an exploded side perspective view of the bicycle utilizing the frame according to the present invention and represented in FIG. 1.
Figure 7:
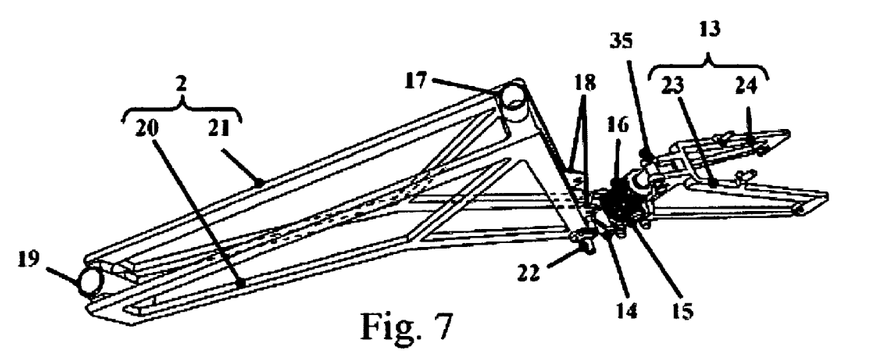
FIG. 7 represents a perspective view of the single frame of the bicycle of FIG. 1.

FIGS. 6-8 show the leverage (14, 15) consists of a first lever (14) and of a second lever (15).

Figures 12, 13:
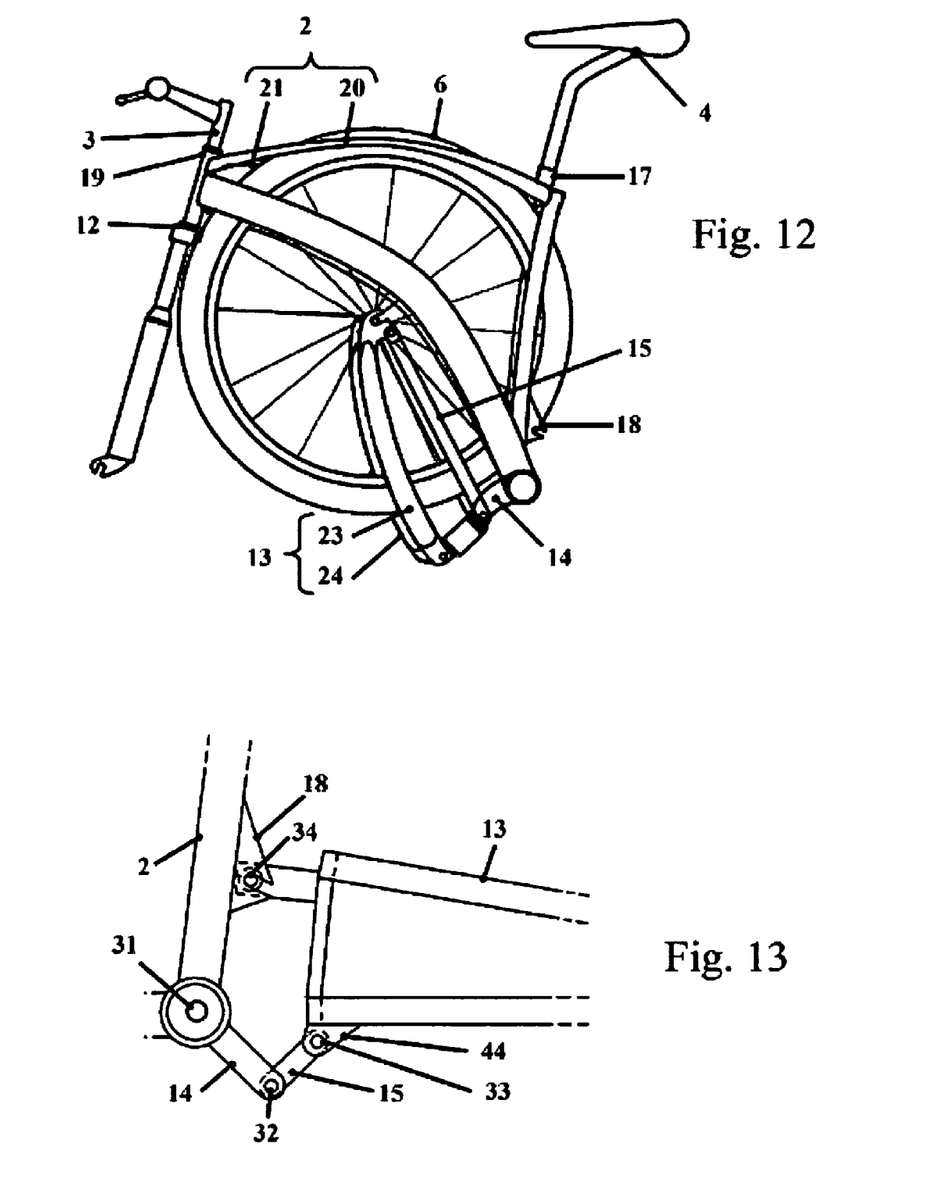
FIG. 12 represents a side perspective view showing the closure condition of the bicycle utilizing the frame of FIG. 9.
FIG. 13 represents a schematic side-view of the frame members of FIG. 1.

FIG. 8 shows the first lever (14) consists of a hollow cylinder (29) intended to be inserted transversely within the separating space between the first portion (20) and the second portion (21) of the first frame (2) in correspondence and coaxially with a first axis (25) that constitutes one of the rotational axes of the leverage (14, 15) and which coincides with the pedalling axis of the bicycle, namely with the rotational axis of the front sprocket (8) around which is supported the chain (10) of the bicycle (1). The axial cavity of the hollow cylinder (29) constitutes the cavity within which the passing-through pin (31) is inserted comprising the third connections (22) or connections of the pedal cranks of the pedals (7). From the hollow cylinder (29) of the first lever (14) derives a second fork (30) at the end of which are fixed in a rotary way by means (FIGS. 8, 13) of a second pin (32) a first end of a rear-damping shock absorber (16) and the first end of a fork shaped second lever (15). The opposite end of the fork shaped second lever (15) is fixed by means (FIGS. 8, 13) of a third pin (33) to the second frame or swinging fork (13). The second end of the shock absorber (16) is fixed in a rotary way at the upper front end of the second frame or swinging fork (13) and, more precisely, in correspondence of a fourth pin (34) that will be described in the following of the present description.

The third portion (23) and the fourth portion (24) of the second frame or swinging fork (13) constitute essentially a frame shaped like a parallelogram and the third portion (23) and the fourth portion (24) are reciprocally spaced and constitute the seat for fixing the rear wheel (6). The third portion (23) and the fourth portion (24) are reciprocally connected in correspondence with one of the sides of the parallelogram shape. The side of the parallelogram shape that constitutes the conjunction region between the third portion (23) and the fourth portion (24) includes on the upper part a fourth pin (34) provided with a fourth connection (35) intended to be coupled with a corresponding coupler means (18) present rearward on the first frame (2). The fourth pin (34) also constitutes the fixing point, by a rotary fixing, of the second end of the rear-damping shock absorber (16).

By means of the reciprocal fixing of fourth connection (35) of the second frame or swinging fork (13) and coupler means (18) of the first frame (2) the frame of the bicycle is blocked in its whole in the extended position of use. The fixing is made by means of (FIG. 4) releasable blocking means (45) of known art.

Figure 2:
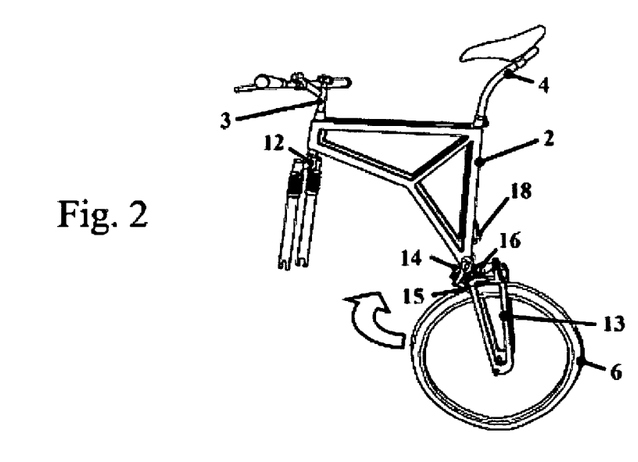
FIG. 2 represents a side perspective view showing a first phase of the closure of the bicycle utilizing the frame of FIG. 1.

Starting from the extended configuration (FIG. 1) of use of the bicycle (1), the reaching the folded configuration is obtained by means of removal of the front wheel (5) that is equipped with fast coupling/release means according to prior art. Successively the releasable fastening means that fix reciprocally the fourth connection (35) and the coupler means (18) are released. In this way (FIG. 2) the second frame or swinging fork (13) can be moved refolding it downward and in the direction towards the first fork or front fork (12) of the bicycle (1).

The leverage (14, 15) allows for a roto-translation movement of the second frame or swinging fork (13) and rear wheel (6) from the extracted position up to the insertion of the rear wheel (6) within the cradle defined by the separating space between the reciprocally spaced first portion (20) and second portion (21) of the first frame (2). The roto-translation movement of the second frame or swinging fork (13) occurs essentially (FIGS. 8, 13) by means of rotation, according to the direction indicated by the arrow, of the first lever (14) around the first axis (25) defined by the first pin or passing-through pin (31), rotation of the second lever (15) around the second axis (26) defined by the second pin (32), rotation of the second frame or swinging fork (13) around the third axis (27) defined by the third pin (33).

In similar way the leverage (14, 15) allows for a roto-translation movement of the second frame or swinging fork (13) and of the rear wheel (6) from the withdrawn position. In the extraction movement the rear wheel (6) exits from the cradle defined by the separating space between the reciprocally spaced first portion (20) and second portion (21) of the first frame (2). The roto-translation movement of the second frame or swinging fork (13) occurs essentially (FIGS. 8, 13) by means of rotation of the first lever (14) around the first axis (25) defined by the first pin or passing-through pin (31), rotation of the second lever (15) around the second axis (26) defined by the second pin (32), rotation of the second frame or swinging fork (13) around the third axis (27) defined by the third pin (33) until when the fourth axis (28) of the fourth pin (34) on which there is the fourth connection (35) falls in line with the corresponding axis of the coupler means (18) for the reciprocal fixing of the second frame or swinging fork (13) at the first frame (2).

Figure 3:
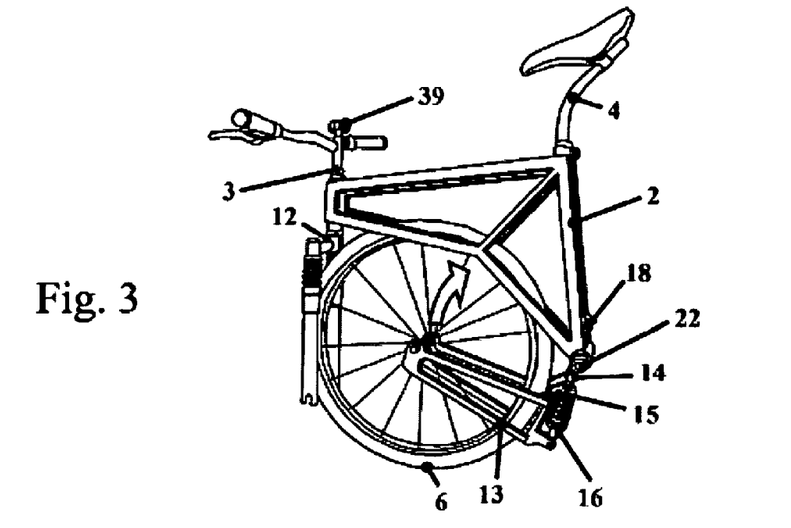
FIG. 3 represents a side perspective view showing a second phase of the closure of the bicycle utilizing the frame of FIG. 1.

Therefore the leverage (14, 15) allows for a roto-translation movement of the second frame or swinging fork (13) and of the rear wheel (6) which from the extracted position (FIG. 1) moves below (FIG. 2) with respect to the first frame (2) and successively (FIG. 3), proceeding the roto-translation movement, it begins to be inserted within the cradle defined by the separating space between the reciprocally spaced first portion (20) and second portion (21) of the first frame (2) until it reaches (FIG. 4) a condition of maximum insertion in which the first frame (2) circumscribes the rear wheel (6).

Advantageously the connecting multiple levers configuration (14, 15) between the first frame (2) and the second frame or swinging fork (13) allows to position a shock absorber (16) between (FIGS. 7, 8, 13) the second pin (32) and the fourth pin (34), the shock absorber (16) providing the corresponding damping action acting on the second axis (26) defined by the second pin (32) and damping the reciprocal movements induced on the frames (2, 13) by the asperity of the ground. The position and the arrangement of the shock absorber is such that the pedalling energy is not absorbed from the same shock absorber, the shock absorber being advantageously placed according to a work direction corresponding to that of the oscillations induced by the asperity of the ground on the frame of the bicycle.

As one will appreciate from the previous description, from the evidenced characteristics and from the attached figures, the solution according to the present invention allows advantageously to resort to wheels of normal sizes, also of considerable sizes. Therefore, advantageously, in the condition of use, the bicycle according to the present invention is shaped as a bicycle of normal sizes that can be for example a sporting bicycle, a mountain bike, a town bicycle, etc. This considerably facilitates its use as it is not subject to all the problems of the folding bicycles of the prior art in which one must resort to wheels of small diameter, which give rise to bicycles only suitable to short range movements. In the closed configuration of the bicycle, instead, the bicycle according to the present invention is particularly compact so as to have an encumbrance practically corresponding, according to a side view, to that of the square circumscribed to the rear wheel circle.

Figure 14:
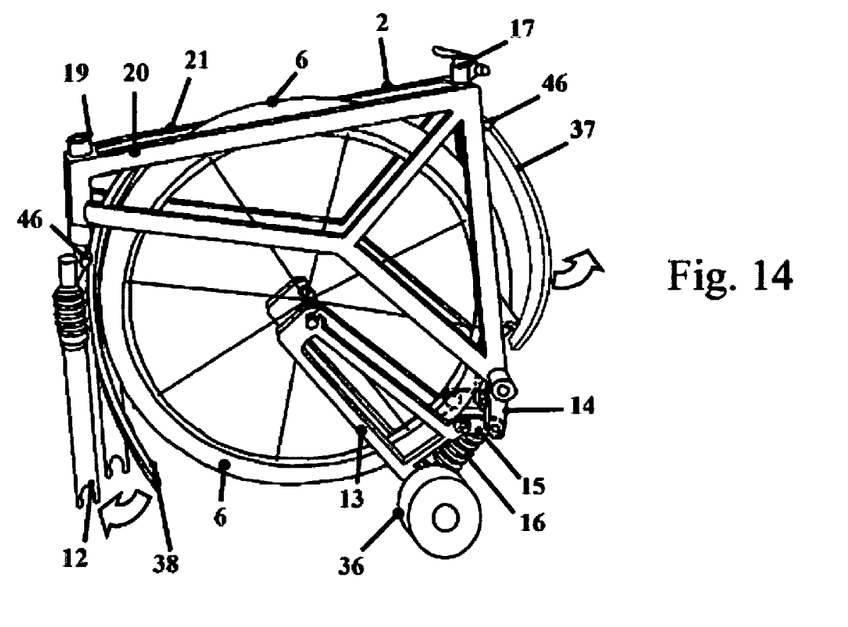
FIG. 14 represents a side perspective view showing the closure condition of the bicycle utilizing the frame of FIG. 1.
Figure 15:
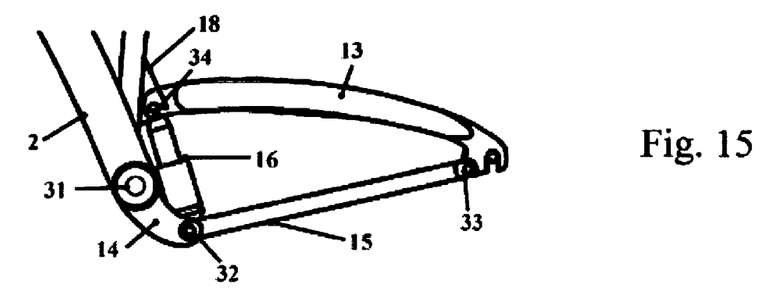
FIG. 15 represents a schematic side-view of the frame members of FIG. 9.
Figure 16:
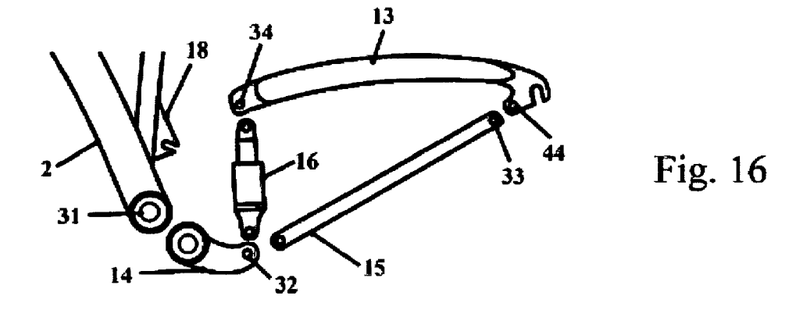
FIG. 16 represents an exploded schematic side-view of the frame members of FIG. 15.

Furthermore (FIG. 14) the bicycle (1) according to the present invention can provide also the presence of at least one roller (36) or a couple of rollers (36) placed on the second frame or swinging fork (13) which in the extended position of the bicycle will be placed on the upper part with respect to the bicycle (1), while in the closed position, thanks to the roto-translation movement of the second frame or swinging fork (13), will be placed below with respect to the bicycle (1), constituting dragging rollers (36) that simplify the movement of the bicycle (1) when it is in closed position.

Advantageously the solution according to the present invention allows for a bicycle that in folded configuration is particularly compact but without altering the reciprocal position of second frame or swinging fork (13) and rear wheel (6). The alteration of the reciprocal position of front sprocket (8) and rear sprocket (9) that occurs by means of the described roto-translation movement does not involve problems for the chain (10) because possible reciprocal spacing of front sprocket (8) and rear sprocket (9) are recovered either from the usual slackness provided for the chain itself or thanks to the action of the chain tightener (11), if present.

The possible dynamo (not shown) for the generation of the electric current for the lighting devices (not represented) usually present on the bicycle (1) can be indifferently placed at the first fork or front fork (12) or in correspondence of the second frame or swinging fork (13). The fact of having a fixed configuration between second frame or swinging fork (13) and rear wheel (6) allows easily to position the dynamo in correspondence of the second frame or swinging fork (13), so that the presence of the dynamo does not hinder the removal and the application of the front wheel (5) on the first fork or front fork (12).

Optionally (FIG. 14) the bicycle can include a rear mudguard (37), for example fastened by hinging or fulcrum (46) on the first frame (2). In this way the rear mudguard (37) can be moved from an extracted position in which occurs the protection function of the user of the bicycle from possible spatters raised by the rear wheel (6) to a withdrawn position in which the rear mudguard (37) is essentially adherent to the first frame (2). If necessary, in a different embodiment it can be provided that the rear mudguard (37) is fixed to the second frame or swinging fork (13), the rear mudguard (37) being able to be moved to a withdrawn position in which the rear mudguard (37) is essentially adherent to the frame (2, 13). Optionally (FIG. 14) the bicycle can include a front mudguard (38), for example fastened by hinging or fulcrum (46) on the first fork or front fork (12). In this way the front mudguard (38) can be brought to an extracted position in which it performs the protection function of the user of the bicycle from possible spatters raised by the front wheel (8) to a withdrawn position in which the front mudguard (38) is internally folded rearward within the front fork (12) and the cradle defined by the separating space between first portion (20) and second portion (21) of the first frame (2).

Figure 5:
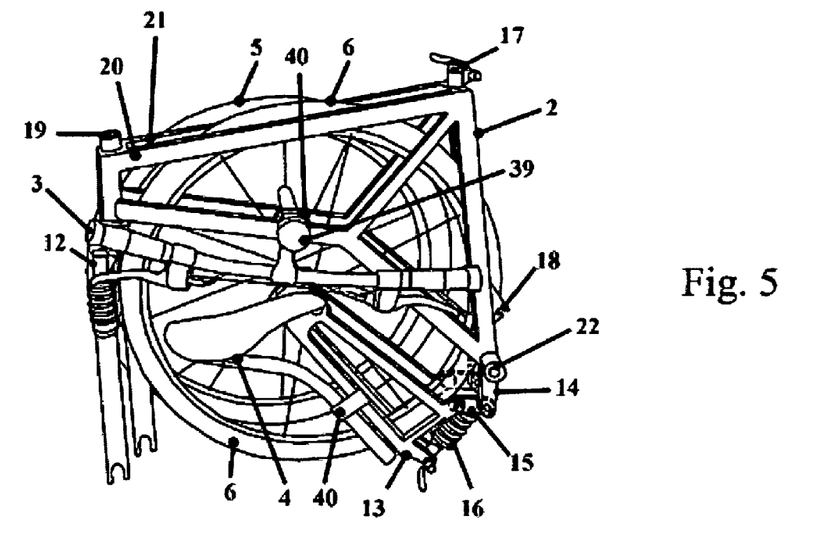
FIG. 5 represents a side perspective view showing the fixing of the auxiliary elements of the bicycle in the closure condition of the same shown in FIG. 4.

In a first embodiment (FIG. 5) of the bicycle according to the present invention, to further reduce the total encumbrance it is provided that the handle-bar (3) can be removed from the first frame (2) by means of fast coupling/release means (39) and/or, in similar way, that also the saddle (4) can be rapidly extracted from the first frame (2) by means of analogous fast coupling/release means. Both the saddle (4) and the handle-bar can then be fixed in correspondence with appropriate fastening means (40) to the bicycle in its closed configuration.

Figure 17:
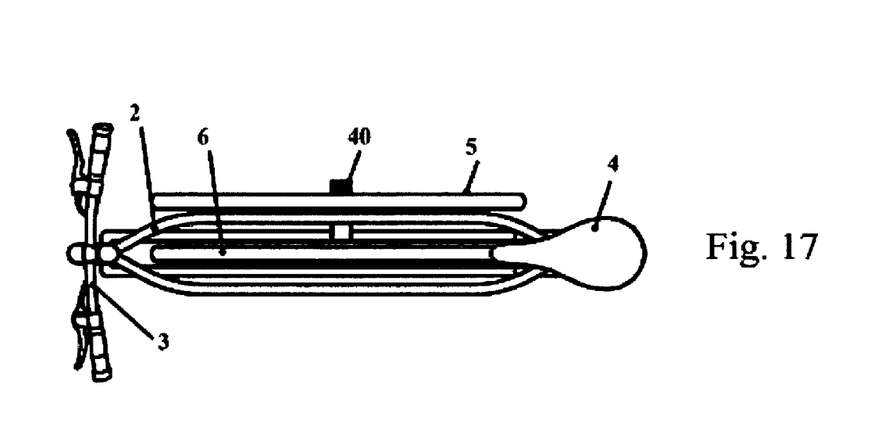
FIG. 17 represents a schematic plan view of the frame for bicycles according to the present invention.

In similar way also the previously removed front wheel (5) may be fixed to the bicycle in its closed configuration (FIG. 17) sideways and outside with respect to the first frame (2) by means of fastening means (40). Obviously will be provided also different embodiments in which the insertion cradle present in the first frame (2) provides a sufficient space and appropriate fastening means to house on its inside also the front wheel (5), practically near the rear wheel (6). Such solutions can be provided alternatively or in combination also in function of the sizes of the wheels (5, 6) to install on the bike, being obvious that racing bikes for use on road have wheels with extremely reduced width sizes while bikes of the mountain bike type have wheels with greater width sizes.

In a different embodiment (not shown) the handle-bar (3) can be endowed with folding means of the side-arms of the same handle-bar, so that removing the handle-bar (3) will not be needed, but it will be sufficient simply folding the arms of the same handle-bar. In a solution of this type it can also be provided that the handle-bar in the position with the folded arms constitutes a handle for dragging the bicycle in folded position making it slide (FIG. 14) on the rollers (36).

Preferably also the pedals (7) fold so that the pedals (7) do not protrude from the minimum encumbrance of the hub of the pedal crank.

Alternatively to the solution that provides the removal of the saddle (4), it may be provided that the saddle is simply lowered until a condition close to adhering to the first frame (2), in order to reduce the total height without requiring the removal of the same saddle.

FIGS. 9-12 show a first frame (2) including (FIG. 9) the connections for the pedals (7) that engage on a front sprocket (8) whose rotary motion is transmitted by means of a chain (10) to a rear sprocket (9) integral with the rear wheel (6) if necessary by means of a chain tightener (not represented). Also in this case, preferably, the connection between the levers of the brakes and the braking devices and between the gear-shift devices and the levers of the gear-shift occurs by means of cables that are made pass at least partially and at least for some sections within the first frame (2) that in the preferred form of embodiment of the present invention is internally hollow. Also in this case the first frame (2) is shaped (FIG. 10) with a first portion (20) and second portion (21) reciprocally parallel and longitudinally developing lengthwise with respect to the bicycle (1) and reciprocally spaced by a distance which corresponds to and is greater than the maximum width of the rear wheel (6). The space defined by the separation between the reciprocally spaced first portion (20) and the second portion (21) constitutes an insertion cradle for the rear wheel (6). Also in this case the second frame or swinging fork (13) is shaped (FIG. 11) with a third portion (23) and a fourth portion (24) essentially reciprocally parallel or slightly diverging in the direction towards the rear part of the bicycle (1). The third portion (23) and the fourth portion (24) longitudinally develop lengthwise of the bicycle (1) and are reciprocally spaced of a distance which corresponds to and is greater than the maximum width of the rear wheel (6). The third portion (23) and the fourth portion (24) include the seats for fixing the rear wheel (6). Also in this case the second frame or swinging fork (13), bearing the rear wheel (6), is fixed at the first frame (2) by means of a leverage (14, 15) that allows the rotation and the translation of the second frame or swinging fork (13) with respect to the first frame (2). The roto-translation movement of the second frame or swinging fork (13) by means of the leverage (14, 15) allows the movement of the rear wheel (6): from an extended position in which the rear wheel (6) is in the position of use behind the first frame (2); to a withdrawn position in which the rear wheel (6) is within the insertion cradle for the rear wheel (6) defined by the separating space between the first portion (20) and the second portion (21) of the first frame (2).

In the embodiment shown in FIGS. 12, 13, 15 and 16 the second lever (15) extends as far as to the connecting region of the rear wheel (6) on the second frame or swinging fork (13). In practice in the previously described parallelogram configuration relating to the second frame or swinging fork (13) of the first embodiment, in this embodiment one of the arms of the parallelogram configuration is replaced by the second lever (15).

The third portion (23) and the fourth portion (24) of the second frame or swinging fork (13) constitute essentially a frame shaped according to a "U" plan configuration and the third portion (23) and the fourth portion (24) are reciprocally spaced and constitute the seat for fixing the rear wheel (6). The third portion (23) and the fourth portion (24) are reciprocally connected in correspondence of the short side of the "U" shape. The side of the "U" shape that constitutes the conjunction region between the third portion (23) and the fourth portion (24) includes on the upper part a fourth pin (34)

provided with a fourth connection (not represented but similar to that of the first embodiment of FIG. 8) able to couple with a corresponding coupler means (18) present rearward on the first frame (2).

Also with reference to this second embodiment (FIGS. 9, 10, 11, 12, 15, 16) of the frame, are valid the same considerations made referring to the first embodiment of the previously described frame (FIGS. 1, 2, 3, 4, 5, 14) relatively to the supply of dragging rollers (36), to the supply of fastening means (40) for the handle-bar (3) and for the saddle (4), to the possibility to equip the handle-bar (3) with systems for folding the arms, to the supply of the rear and front mudguards (37, 38), to the possibility to adopt foldable type pedals.

Also with reference to this second embodiment (FIGS. 9, 10, 11, 12, 15, 16), advantageously the configuration with multiple levers (14, 15) for connection between the first frame (2) and the second frame or swinging fork (13) allows to position a shock absorber (16) between (FIGS. 15, 16) the second pin (32) and the fourth pin (34), the shock absorber (16) providing the corresponding damping action acting on the second axis (26) defined by the second pin (32) and damping the reciprocal movements induced on the frames (2, 13) from the asperity of the ground.

Preferably, the engagement means (34, 35) intended to be coupled with corresponding coupler means (18) present behind said first frame (2) are a fourth pin (34) provided with fourth connections (35) able to couple by means of insertion in a seat of insertion present on the coupler means (18). Preferably the coupler means (18) are a couple of coupler means (18) including a seat of insertion shaped as an insertion eyelet. The orientation of this eyelet corresponds to the counter rotation and counter translation direction of the second frame or swinging fork (13) during the opening movement.

The second frame or swinging fork (13) is fixed at the first frame (2) by means of a leverage (14, 15) comprising a first lever (14) and a second lever (15). The first lever (14) consists of a hollow cylinder (29) intended to be inserted transversely within a separating space between the connections for the pedal cranks of the bicycle in correspondence and coaxially with a first axis (25) that constitutes one of the rotational axes of the leverage (14, 15) and that coincides with the pedalling axis of the bicycle (1), namely with rotational the axis of the front sprocket (8). The axial cavity of the hollow cylinder (29) constitutes the cavity within which a passing-through pin is inserted (31) comprising third connections (22) or connections of the pedal cranks bearing the pedals (7). From the hollow cylinder (29) of the first lever (14) derives a second fork (30) at the end of which is fixed in a rotary way by means of a second pin (32) a first end of the second lever (15) shaped like fork. The opposite end of the second lever (15) shaped like fork is fixed by means of said third pin (33) to the second frame or swinging fork (13) in correspondence of the fifth connection (44). The leverage (14, 15) allows the rotation and the translation of the second frame or swinging fork (13) with respect to the first frame (2) on a parallel plane with respect to the plane defined by and containing the first frame (2). The rotation and translation corresponds to a closure of the second frame or swinging fork (13) in the direction towards the first frame (2) and downward. Vice-versa the leverage (14, 15) allowing the counter rotation and the counter translation of the second frame or swinging fork (13) with respect to the first frame (2) on a parallel plane with respect to the plane defined by and containing the first frame (2). The counter rotation and counter translation corresponds to an opening of the second frame or swinging fork (13) moving away from said first frame (2) and upwards in the direction opposite to that of the previously described rotation and translation.

Preferably the first frame (2) is shaped with a first portion (20) and a second portion (21) that preferably but not necessarily are reciprocally approximately parallel. The first portion (20) and the second portion (21) longitudinally developing lengthwise with respect to the bicycle (1) and are reciprocally spaced by a distance which corresponds to and is greater than the maximum width of the rear wheel (6). The space defined by the separation between the reciprocally spaced first portion (20) and the second portion (21) constitutes an insertion cradle for the rear wheel (6).

More in detail the leverage (14, 15) allows the rotation and the translation of the second frame or swinging fork (13) with respect to the first frame (2) on a parallel plane with respect to the plane defined by and containing the first frame (2). The roto-translation movement of the second frame or swinging fork (13) by means of the leverage (14, 15) allowing the movement of the rear wheel (6): from an extended position in which the rear wheel (6) is in the position of use behind the first frame (2); to a withdrawn or closed position in which the rear wheel (6) is within the insertion cradle defined by the separating space between the first portion (20) and the second portion (21) of the first frame (2).

Furthermore in the frame for bicycles (1) according to the present invention, the first frame (2) can have a shape essentially corresponding to a portion of the approximately circumscribing square according to one side-view the rear wheel (6), the rotation of the components or levers of the leverage (14, 15) around the respective rotational axes (25, 26, 27) corresponding to the roto-translation movement of the second frame or swinging fork (13) and rear wheel (6) which from the extracted position moves below with respect to the first frame (2) and successively, proceeding this roto-translation movement, is inserted within the cradle defined by said separating space between the reciprocally spaced first portion (20) and the second portion (21) of the first frame (2) until it reaches a condition of maximum insertion in which the first frame (2) circumscribes the rear wheel (6), in the closed configuration of the bicycle (1), the bicycle resulting particularly compact with an encumbrance practically corresponding to that of the square circumscribed to the circle of the rear wheel (6). For example with wheels suitable to a rim of 24 inches can be obtained a maximum encumbrance approximately of 65 cm×65 cm with a width approximately of 16-20 cm. The present invention allows, therefore, to obtain foldable bicycles with wheels of normal sizes and also for a hard and sporting use in which the sizes of the closed bicycle are approximately coinciding with those of the square circumscribing the wheel. The wheel can have, only as an example, sizes from 16 to 28 inches. Obviously the lower will be the sizes of the wheel, the lower will be the encumbrance sizes obtainable with closed frame.

Furthermore in the frame for bicycles (1) according to the present invention, the first frame (2) can have a shape essentially corresponding to a portion of the approximately circumscribing square according to one side-view the rear wheel (6), the rotation of the components or levers of the leverage (14, 15) around the respective rotational axes (25, 26, 27) corresponding to the roto-translation movement of the second frame or swinging fork (13) and rear wheel (6) which from the extracted position moves below with respect to the first frame (2) and successively, proceeding this roto-translation movement, is inserted within the cradle defined by said separating space between the reciprocally spaced first portion (20) and the second portion (21) of the first frame (2) until it reaches a condition of maximum insertion in which the first frame (2)

circumscribes the rear wheel (6), in the closed configuration of the bicycle (1), the bicycle resulting particularly compact with an encumbrance practically corresponding to that of the square circumscribed to the circle of the rear wheel (6). For example with wheels suitable to a rim of 24 inches can be obtained a maximum encumbrance approximately of 65 cm×65 cm with a width approximately of 16-20 cm. The present invention allows, therefore, to obtain foldable bicycles with wheels of normal sizes and also for a hard and sporting use in which the sizes of the closed bicycle are approximately coinciding with those of the square circumscribing the wheel. The wheel can have, only as an example, sizes from 16 to 28 inches. Obviously the lower will be the sizes of the wheel, the lower will be the encumbrance sizes obtainable with closed frame.

Furthermore in the frame for bicycles (1) according to the present invention, the first frame (2) can have an essentially triangular shape, delimited by: first end (42) constituting a first vertex of the triangle comprising the first connection (17) of the saddle (4); second end (41) constituting a second vertex of the triangle comprising the second connection (19) for the handle-bar (3) and for the first fork or front fork (12) bearing the front wheel (5); third end (43) constituting a third vertex of the triangle comprising the third connection (22) or connection for the couple of pedal cranks bearing the pedals (7) and the front sprocket (8).

Advantageously the frame for bicycles (1) according to the present invention can include a shock absorber (16): a first end of the shock absorber (16) being fixed in a rotary way in correspondence of the fixing midpoint between the first lever (14) and the second lever (15) in correspondence of the second pin (32); a second end of the shock absorber (16) being fixed in a rotary way in correspondence of the fourth pin (34); the shock absorber (16) providing a corresponding damping action acting on the second pin (32) and damping the reciprocal movements induced on first frame (2) and second frame or swinging fork (13).

Furthermore in the frame for bicycles (1) according to the present invention, can be present fastening means of the front wheel (5). The fastening means of the front wheel (5) are suitable for the fixing of the front wheel (5) sideways and outside with respect to the first frame (2), in the withdrawn or closed condition of the bicycle (1) the front wheel (5) being fixed in an condition being essentially parallel to and aligned with the rear wheel (6), the front wheel (5) being equipped with fast coupling/release means.

The present invention further relates to a bicycle (1) that includes a frame (2, 13) for bicycles (1) described according to the characteristics.

The description of the present invention has been made with reference to enclosed figures in a form of preferred embodiment of the same, but it is evident that many possible alterations, changes and variants will be immediately clears to those skilled in the art of the sector in view of the previous description. So, it should be stressed that the invention is not limited by the previous description, but contains all alterations, changes and variants as would be apparent to one of skill in the art.

What is claimed is:

1. A bicycle comprising:
a frame having two side sections spaced apart at a distance, one of said two side sections is a left side section and one of said two side sections is a right side section, at least three connections, a first one of said at least three connections for a saddle, a second one of said at least three connections for front fork, a third one of said at least three connections for a crank, each of said two side sections disposed between and connected to said at least three connections;
wherein the crank is connected at a fixed location relative to the frame;
a rear fork connected to said frame to define a first axis, said rear fork rotating about said first axis from an extended position to a folded position wherein the distance is large enough to receive a wheel within the two side sections of the frame in the folded position;
said connection of said rear fork to said frame is by a first link having two locations;
a first one of side two locations of said first link rotatably connected to said frame at said first axis;
a second one of said two locations of said first link rotatably connected to said rear fork to define a second axis;
said rear fork moving between the extended and folded positions by rotating about said second axis wherein said second axis moves in a radial path about said first axis according to a length of said first link such that in the folded position an axle of said rear wheel is located between said second and third connections.

2. The bicycle of claim 1 further comprising:
a releasable connection between said frame and said rear fork fixing said rear fork in said extended position when said releasable connection is engaged.

3. The bicycle of claim 1 further comprising:
said rear fork including second and third links;
said second link rotatably connected at a first location of said second link to the second location of said first link and rotatably connected to a first location of a shock absorber;
a second location of said second link rotatably connected at a first location of said third link;
said third link releasably connected to said frame and rotatably connected to a second location of said shock absorber;
wherein said first and second links rotate in opposing directions to against a bias to induce displacement of said shock absorber.

4. The bicycle of claim 1 further comprising at least one roller located on said rear fork, said at least one roller in the extended position disposed upwardly, and in the folded position said at least one roller disposed downwardly.

5. The bicycle of claim 1 further comprising a front fork including hinges to fix a front mudguard, said front mudguard moving from an extracted position to a withdrawn position;
wherein in the withdrawn position part of said front mudguard is folded within said left and right sections of said frame.

6. The bicycle of claim 5 further comprising a rear mudguard rotatably connected to said frame and rotating from an extracted position to a withdrawn position;
wherein in said withdrawn position said rear mudguard is essentially adherent to said frame.

7. The bicycle of claim 1 wherein said first and second links rotate in opposing directions against a bias to induce displacement of said shock absorber.

8. A bicycle comprising:
a frame comprising two side sections spaced apart at a distance, one of said two side sections is a left side section and one of said two side sections is a right side section, and at least three connections, each of said two side sections disposed between and connected to said at least three connections;
a first link rotatably connected to said frame at a first location of said first link to define a first axis;

a rear fork including a second link, a third link and a shock absorber; said second link rotatably connected at a first location of said second link to a second location of said first link and rotatably connected to a first location of said shock absorber;

said third link rotatably connected to a second location of said second link;

said third link releasably connected to said frame and rotatably connected to a second location of said shock absorber said rear fork rotatable about said first axis from an extended position to a folded position;

said distance large enough to receive a wheel within said two side sections of the frame such that when said rear fork is in the folded postion, at least part of the wheel is located between said two side sections.

9. The bicycle of claim 8 wherein said first and second links rotate in opposing directions against a bias to induce displacement of said shock absorber.

10. The bicycle of claim 8 further comprising:
a releasable connection between said frame and said rear fork adapted to fix said rear fork in said extended position when said releasable connection is engaged.

11. The bicycle of claim 10 wherein said first and second links rotate in opposing directions against a bias to induce displacement of said shock absorber.

12. The bicycle of claim 8 further comprising at least one roller located on said rear fork, said at least one roller in the extended position disposed upwardly, and in the folded position said at least one roller disposed downwardly so as to facilitate the movement of the bicycle in the folded position.

13. The bicycle of to claim 8 further comprising a front fork including hinges to fix a front mudguard, said front mudguard moving from an extracted position to a withdrawn position;
wherein in the withdrawn position part of said front mudguard is folded within said left and right sections of said frame.

14. The bicycle of claim 13 further comprising a rear mudguard rotatably connected to said frame and rotating an extracted position to a withdrawn position;
wherein in said withdrawn position said rear mudguard is essentially adherent to said frame.

15. The bicycle of claim 14 wherein said first and second links rotate in opposing directions against a bias to induce displacement of said shock absorber.

16. A bicycle comprising:
a frame;
a first link having a first location rotatably connected to said frame;
a rear fork rotatably connected to a second location of said first link and connected to said frame at another location;
said rear fork having second and third links and a shock absorber;
said second link rotatably connected at a first location of said second link to the second location of said first link and rotatably connected at said first location of said second link to a first location of said shock absorber;
said third link rotatably connected to a second location of said second link;
said third link rotatably connected to a second location of said shock absorber.

17. The bicycle of claim 16 further comprising:
a connector releasably securing said frame to said rear fork at the another location in the extended position;
said rotatable connection of said first link to said frame defines a first axis and said rotatable connection of said rear fork to said first link to defines a second axis;
wherein when said connector is released, said rear fork moves between an extended and a folded position by rotation about the second axis wherein the second axis translates in a radial path about the first axis according to a length of said first link.

18. The bicycle of claim 17 wherein said frame includes a left section and a right section spaced apart at a distance, the bicycle further comprising:
a wheel mounted to said rear fork wherein in the folded position, part of the wheel is inserted between the left and right sections of the frame.

19. The bicycle of claim 17 further comprising at least one roller located on said rear fork, said at least one roller in the extended position disposed upwardly, and in the folded position said at least one roller disposed downwardly so as to facilitate the movement of the bicycle in the folded position.

20. The bicycle of claim 16 further comprising a front fork for supporting a front wheel of the bicycle including hinges to fix a front mudguard, said front mudguard moving from an extracted position to a withdrawn position;
wherein in the withdrawn position part of said front mudguard is folded within a left and a right sections of said frame.

21. The bicycle of claim 20 further comprising a rear mudguard rotatably connected to said frame and rotating from an open position to a closed position;
wherein in said closed position said rear mudguard is essentially adherent to said frame.

22. The bicycle of claim 16 wherein said first and second links rotate in opposing directions against a bias to induce displacement of said shock absorber.

23. The bicycle of claim 16 wherein the another location is in an area adjacent to the second location of said shock absorber.

24. The bicycle of claim 16 wherein the another location is at the second location of said shock absorber.

* * * * *